United States Patent Office 3,514,453
Patented May 26, 1970

3,514,453
1-ARALKYL-3,3-DISUBSTITUTED-2-VINYLENE-3H-INDOLE COMPOUNDS
Sydney M. Spatz, 317 Evans St., and Audley L. Cain, 182 Cindy Drive, both of Amherst, N.Y. 14226
No Drawing. Continuation-in-part of application Ser. No. 539,325, Apr. 1, 1966. This application June 22, 1967, Ser. No. 647,930
Int. Cl. C07d 27/56; C09b 23/14
U.S. Cl. 260—240
11 Claims

ABSTRACT OF THE DISCLOSURE

Production of substituted indole compounds, having in the 1-position an aralkyl substituent and in the 2-position a vinylene-containing substituent, which are useful for coloring natural and synthetic fabrics, especially polyacrylonitrile-containing fabrics, which exhibit good light fastness and stability to washing and sublimation.

---

This application is a continuation-in-part application of our application Ser. No. 539,325, filed Apr. 1, 1966, now abandoned.

This invention relates to novel methine type dyes. More particularly it relates to novel substituted indole compounds, having in the 1-position an aralkyl substituent and in the 2-position a vinylene-containing substituent, and to processes of preparing such indole compounds.

Compounds derived from 1-alkyl-3,3-disubstituted-2-vinylene-3H-indole compounds are known. These substituted indole compounds, having an alkyl substituent in the 1-position are commercially useful for preparing dyestuffs. The dyes prepared therefrom are characterized by freedom from the usual solubilizing groups such as, sulfonic acid, carboxylic acid, sulfonyl halide, amide and sulfonamido groups. They give bright, stable colors when deposited on natural and synthetic fibers. However, these dyestuffs are lacking in that they fail to provide the wide range of shades and colors, fastness to light and stability to washing and sublimation demanded for modern fabrics, particularly polyacrylonitrile-containing fabrics.

It is therefore an object of the present invention to provide novel compounds which are salts of 1-aralkyl-3,3-disubstituted-2-vinylene-3H-indole compounds. It is another object of this invention to provide novel dyes for coloring natural and synthetic fabrics; and especially for coloring polyacrylonitrile-containing fabrics deep shades of red or orange having good light fastness and stability to washing and sublimation. A further object of the present invention is to provide a process for preparing 1-aralkyl-3,3-disubstituted-2-vinylene-3H-indole compounds.

These and other objects of the invention will become apparent from the following description.

We have found that valuable characteristics of the aforementioned 1-alkyl substituted indole dyestuffs may be extended by the use of an aralkyl substituent at the 1-position of the indole radical, in lieu of the alkyl substituent. The presence of the aralkyl substituent on the indolium radical is responsible for an unexpected bathochromic shift in the absorption spectra of the dyes giving rise to deeper red or orange colors, which colors are light fast and stable. Since these novel compounds are soluble in water and polar solvents such as alcohols, glycols, and dioxanes, they are useful for dyeing a wide variety of materials such as acid modified polyacrylonitriles and polyesters, cotton, wool, paper, photographic film, and the like. Fabrics dyed with these materials possess excellent wash fastness with minimum staining, and are stable to light in the Standard Fade-Ometer test (ASA No. Ll4.53-1961) for 15 to 80 hours.

In accordance with the present invention, it has been found that a novel class of compounds, namely the 1-aralkyl-3,3-disubstituted indole salts to which a substituted nitrogen-containing heterocyclic radical is connected by a conjugated carbon chain attached to the 2-carbon atom of the indolium nucleus have advantageous properties which render them suitable for dyeing synthetic and natural fiber. The novel dyes of the present invention are especially valuable as dyes for acrylonitrile-containing fibers, imparting durable, deep, brilliant, orange or red shades to the fibers which are light and wash fast.

The compounds of the present invention may be generally defined as 1-aralkyl-2,3,3-trisubstituted indolium salts containing two nitrogen atoms connected by a conjugated carbon chain having an uneven number of carbon atoms in the chain so that color forming resonance is imparted to the molecule. The salts are composed of four segments, as illustrated by the following general structure:

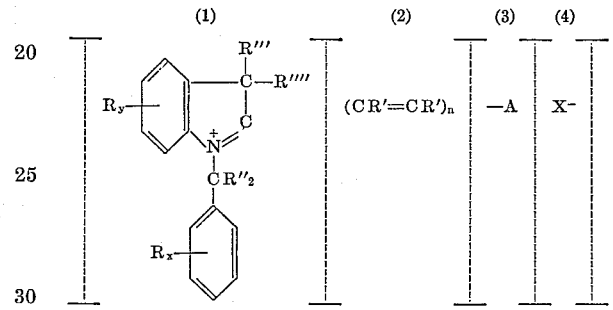

where the four segments are:

(1) A 1-aralkyl-2,3,3-substituted indolium residue having a double bond in the 2-position and being linked through the 2-position to one end of a vinylene-containing chain.

(2) A vinylene-containing chain residue connected to the 2-position of an indolium residue (1) and to a nitrogen-containing heterocyclic residue (A), wherein $n$ is an integer of from 1 to 5 preferably 1 or 2, such that said vinylene-containing chain comprises a carbon chain having a total length comprising an uneven number of carbon atoms, preferably from 5 to about 11 carbon atoms linking the indolyl nitrogen with the nitrogen of a heterocyclic amino radical.

(3) A nitrogen-containing residue, (A), comprising a heterocyclic radical which is connected, by means of the vinylene-containing chain residue (2), from its nitrogen atom, through the vinylene-containing chain to the nitrogen atom of the indolium residue.

(4) An acid anion.
$x$ has a value of from 0–5.
$y$ has a value of from 0–4.

Suitable nitrogen-containing heterocyclic radicals are pyrryl, quinolyl, pyridyl, piperidyl and preferably indolyl radicals.

It is contemplated that the 1-aralkyl substituent may be substituted at its replaceable hydrogens with 1 to 5 simple substituents, represented by R in the above formula, inert to condensation reactions, such as the following radicals; alkyl (especially those derived from lower hydrocarbons i.e. containing 1–5 carbon atoms); cycloalkyl of 5 or 6 carbon atoms, nitro, aryl (especially of the phenyl, naphthyl and biphenyl series); aralkyl; halogens; lower alkoxy; and cyano groups. The substituents may be the same or different, and thus series of compounds are available, varying slightly in shade and brilliance of color. In the 1-aralkyl substituent, R″ is selected from the group consisting of hydrogen and lower alkyl-containing 1–5 carbon atoms. Representative of such substituents are: chlorine, bromine, fluorine, methyl, ethyl, propyl, butyl, chloroethyl, cyanoethyl, methyoxy, ethoxy, propoxy, butoxy, cyclopentyl, cyclohexyl, phenyl, tolyl and naphthyl.

Similarly, the benzo nuclei of the indolyl radicals, the nitrogen-containing hetercocyclic radicals, and any phenyl substituent on these cyclic radicals, may be substituted at their replaceable hydrogens with any of the above mentioned substituents as well as by alkylsulfonyl, arysulfonyl, and sulfamyl radicals. The number of substituents may vary from zero up to the number of replaceable hydrogens present. The substituents may be the same or different and may be varied to produce dyes in a series of nuances of basic colors. Representative of such substituents are those mentioned above as well as methyl sulfamyl, ethyl sulfamyl, phenyl sulfamyl and naphthyl sulfamyl.

The 3-3-substituents on the indolium radical, represented by R''' and R'''' in the above formula, may be the same or different if selected from the group consisting of alkyl (especially those derived from lower hydrocarbons containing about 1–5 carbon atoms), cycloalkyl of 5 or 6 carbon atoms or lower alkoxy, but if halogens or radicals such as cyano, aryl, and aralkyl are employed, only one such substituent may be present. Representative members of this group are illustrated above.

The carbon atoms of the vinylene-containing chain may also be substituted with such radicals, represented by R' in the above formula, as alkyl, alkoxy (especially those derived from the lower hydrocarbons), and cyano groups.

In addition, the nitrogen atom of the heterocyclic ring in the (A) radical may be substituted with any of the lower alkyl or alkoxyalkyl radicals. Illustrative of such substituents are methyl, ethyl, propyl, isopropyl, butyl, ethoxyethyl, propoxypropyl and methoxyethyl.

Any of several known acids may be used to form the salts of this invention. Typical examples of the useful acids are hydrochloric, hydrobromic, perchloric, sulfuric, phosphoric, acetic, succinic, and any other organic acid having a pK value of at least $10^{-6}$.

The preferred compounds of this invention are methine type dyes whose resonating structures have an aralkyl substituent in the 1-position of the indolium radical, which substituent causes the development of deeper shades than analogous compounds, in which an alkyl group is attached tothe indolium nitrogen. A preferred illustrative compound is 2-[(1-methyl-2-phenylindol-3-yl)-vinylene]-1-benzyl-3,3-dimethyl-3H - indolium hydrogen sulfate, having the following resonating extremes:

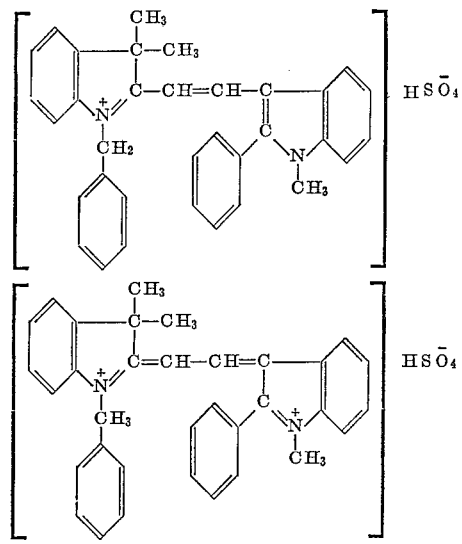

Typical compounds included within this invention are listed as follows :

2-[(1-methyl-2-phenylindol-3-yl)-vinelene]-1-benzyl-3,3-dimethyl-3H-indolium dihydrogen phosphate 2-[(1-methoxyethyl-2-phenylindol-3-yl)-vinelene]-1-phenylethyl-3,3-dibutyl-3H-indolium chloride 2-[(1-phenyl-2-benzylindol-3-yl)-1,3-butadienyl]-1-chlorobenzyl-3-methoxy-3-ethyl-3H-indolium hydrogen sulfate 2-[(1-cyanobutyl-2-naphthylindol-3-yl)-1,3,5-7-octatetraenyl]-1-cyclopentyl-benzyl-3,3-dimethyl-3H-indolium acetate 2-[(1-ethyl-2-benzylindol-3-yl)vinylene]-1-benzyl,3,3-dimethyl-3H-indolium chloride 2-[(1-methyl-2-methylindol-3--yl)-1,3-butadienyl]-1-chlorobenzyl-3-methoxy-3-ethyl-3H-indolium hydrogen sulfate 2-[(1-methyl-2-chloroindol-3-yl)-vinylene]-1-benzyl-3,3-dimethyl-3H-indolium chloride 2-[(1-methyl-2-methylsulfonylindol-3-yl)-vinylene]-1-benzyl-3,3-dimethyl-3H-indolium chloride.

The compounds of this invention may be prepared in various ways. Preferably, a 1-aralkyl substituted indoline is condensed by acid catalysis with equimolecular amounts of a suitable nitrogen-containing heterocyclic aldehyde, desirably in a polar solvent, such as isopropyl alcohol. Advantageously, addition of a nonionic surfactant, such as the polyoxyalkylene derivatives of hexitol anhydride partial long chain fatty acid esters, to the reaction medium promotes crystallinity. The isolated dye salt is then suitable for commercial use without recourse to costly purification.

Alternatively, a 1-aralkyl substituted indolinyl carboxaldehyde, having the aldehyde substituent in the 2-position, may be condensed with 2-alkylene substituted, nitrogen-containing heterocyclic compound.

The amount of acid catalyst or condensing agent employed is not critical provided that an amount at least equal to the equimolecular quantity required to condense with the reactants is used. Usually an amount 1½ to 10 times the equimolecular quantity is employed, since amounts less than 1½ times this value tend to cause slow or incomplete condensations, whereas amounts greater than 10 times the equimolecular quantity have no greater effect on the reaction velocity than does the quantity usually employed.

The condensation reaction is desirably carried out in the presence of a polar solvent. In most instances, hydroxyl-containing substances are suitable, such as aliphatic alcohols (e.g. methanol, ethanol, propanols, butanols, pentanols, hexanols, heptanols, and octanols) and glycols (e.g. ethylene glycol, diethylene glycol, and triethylene glycol). These solvents may be used alone or in admixtures with each other. Moreover, the acids themselves may function as solvents as well as reactants and catalysts.

The temperature at which the condensation is conducted may be varied over a wide range. The reaction temperature is not a critical feature of the process, but may serve within limits, to expedite the condensation, thereby leading to a convenient reaction period. Accordingly, temperatures from about 20° C. to about 210° C. may be employed; however, temperatures ranging from 50° C. to 180° C. are generally preferred. While the reaction may be carried out above or below these temperatures, reactions carried out below 50° C. require inordinately long periods for completion, and at temperatures much above 180° C. decomposition and side reactions may occur thus detracting from the yield of the desired product.

The following 1,3,3-trisubstituted-2-methylene indolines are representative of those which are suitable for use in this process:

1-benzyl-3,3-dimethyl-2-methylene indoline
1-(4-methylbenzyl)-3,3-dibutyl-2-methylene indoline
1-(4-cyclopentylbenzyl)-3-methoxymethyl-3-chloro-2-methylene indoline
1-(4-cyanobenzyl)-3-cyano-3-butyl-2-methylene indoline
1-(4-chlorobenzyl)-3,3-dimethyl-2-methylene indoline
1-(3,4-dichlorobenzyl)-3,3-dimethyl-2-methylene indoline 1-(4-phenylbenzyl)-3,3-dimethyl-2-methylene indoline
1-(4-methoxybenzyl)-3,3-dimethyl-2-methylene indoline.

The following N-containing, substituted cyclic aldehydes exemplify compounds suitable for use in this process:

1-methyl-2-phenylindole-3-carboxaldehyde
1-butyl-2-naphthylindole-3-carboxaldehyde
1-ethyl-2-chlorophenylindole-3-carboxaldehyde
1-methyl-2-ethylindole-3-carboxaldehyde
1,2,5-trimethylpyrrole-3-carboxaldehyde
2-methyl-1-phenylpyrrole-3-carboxaldehyde
1,2-dimethylindole-3-carboxaldehyde
1-methyl-2-benzylindole-3-carboxaldehyde
1-methoxyethyl-2-phenylindole-3-carboxaldehyde The invention is illustrated by the following specific examples. Parts and percentages are by weight.

EXAMPLE I

To a 65° C. solution of 49.8 parts of 1-benzyl-3,3-dimethyl-2-methylene indoline and 47 parts of 1-methyl-2-phenyl-3-indolecarboxaldehyde dissolved in 330 parts of 99% pure isopropyl alcohol, there is added over a period of 2 hours a solution containing 47.2 parts of 85% phosphoric acid dissolved in 26 parts of isopropyl alcohol. The mixture is agitated and heated to reflux. Then 1 part by weight of Tween 20 (a polyoxyalkylene derivative of sorbitan monolaurate) is added and the heating continued for 15½ hours. A red-orange tarry solid precipitates initially which is transformed to a crystalline solid within 20 minutes after heating. The mixture is cooled to room temperature and the crystals are collected by filtration, washed with 266 parts of isopropyl alcohol and dried under vacuum at 50° C. A 97% yield is obtained.

The reddish-orange product has an absorption maximum at 502 mμ and corresponds to the following probable structure:

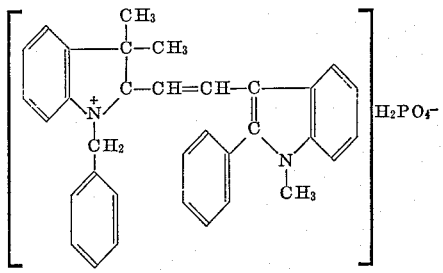

2-[(1-methyl-2-phenylindol-3-yl)-vinylene]-1-benzyl-3,3-di-methyl-3H-indolium dihydrogen phosphate.

The above dyestuff colors Orlon 42 (a polyacrylonitrile fabric) a brilliant, reddish-orange shade having light fastness of about 80 Standard Fade-Ometer hours. The dyeings also possess good wash and sublimation fastness properties.

An analogous dyestuff prepared by condensing 1,3,3-trimethyl-2-methylene indoline with the same substituted indolecarboxaldehyde as used above, has an absorption maximum at 489 mμ and colored Orlon 42 in a yellowish-orange shade. A similar compound prepared from 1-ethyl-3,3-dimethyl-2-methylene indoline has an absorption maximum at 492 mμ and was very similar to the 1-methyl containing dye.

Thus, the use of a 1-benzyl substituent shifts the absorption maximum approximately 13 mμ and produces dyes which yield deeper shades of orange.

EXAMPLE II

To a solution containing 5.0 parts of 1-benzyl-3,3-dimethyl-2-methylene indoline and 3.8 parts of 1-ethyl-2-chlorophenylindole-3-carboxaldehyde dissolved in 70 ml. of isopropyl alcohol, and heated to 70° C., there is added dropwise and with agitation, 5.8 parts of 85% H₃PO₄ dissolved in 7.85 parts of isopropyl alcohol. The mixture is refluxed for 12 hours and agitated for another 8 hours. After decantation of the solvent, the dye is dissolved in 230 parts of water and 0.5 part of Tween 20 is added. The dyestuff is precipitated by the addition of 10 parts of sodium chloride. The mixture is agitated for 3 hours, and the crystals recovered by filtration are dried under vacuum at 55° C. The product corresponds to the following probable structure:

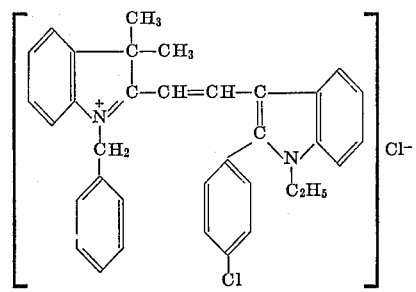

2-([1-ethyl-2-(4-chlorophenyl)-indol-3-yl]-vinylene)-1-benzyl-3,3-dimethyl-3H-indolium chloride.

This dyestuff colors Orlon 42 fabric a brilliant reddish-orange shade. The dyeing also possess good wash and sublimination fastness properties.

EXAMPLE III

To a solution containing 5.0 parts of 1-benzyl-3,3-dimethyl-2-methylene indoline and 4.8 parts of 1-methyl-2-benzylindole-3-carboxaldehyde dissolved in about 40 parts of methanol, there is added 3.5 parts of 85% H₃PO₄. The mixture is refluxed for 12 hours and agitated for another 8 hours. The mixture is poured into 160 parts of water and 0.5 part of Tween 20 is added. Thirty parts of sodium chloride are added and the mixture is agitated for 18 hours to precipitate the product. The solvent is decanted and the product is dried under vacuum at 55° C. The product corresponds to the following probable formula:

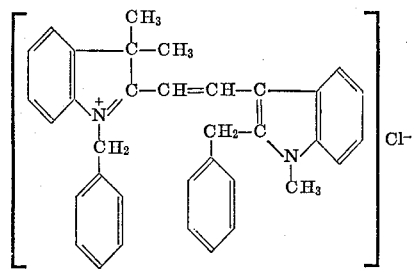

2-[(1-methyl-2-benzylindol-3-yl)-vinylene]-1-benzyl-3,3-dimethyl-3H-indolium chloride.

This dyestuff colors Orlon 42 fabric a brilliant orange shade. The dyeings also possess good wash and sublimation fastness properties.

EXAMPLE IV

A solution containing 4.35 parts of 1-benzyl-3,3-dimethyl-2-methylene indoline and 5.0 parts by weight of 1-methoxyethyl-2-phenylindole-3-carboxaldehyde in 24 parts of anhydrous ethyl alcohol, is heated to 60° C. and agitated until solution is complete. Then 5.8 parts of 85% H₃PO₄ dissolved in 8 parts of anhydrous ethyl alcohol is added dropwise. The mixture is heated and agitated for 16 hours. After cooling and pouring the reaction mixture into 250 parts of water, 0.5 part of Tween 20 and 50 parts of sodium chloride are added. The mixture is agitated for 4 hours and the precipitated dyestuff is collected by filtration and dried in vacuum at 55° C. The product corresponds to the following probable structure:

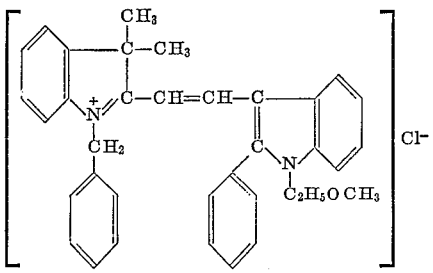

2-[(1-methoxyethyl-2-phenylindol-3-yl)-vinylene]-1-benzyl-3,3-dimethyl-3H-indolium chloride.

This dyestuff imparted a brilliant reddish color to Orlon 42. The dyeings also exhibit good washing and sublimation fastness properties.

The foregoing examples are for purposes of illustration only. It is understood that the invention is not limited to the details set out therein and that obvious changes and modifications will be apparent and can be made without departing from the spirit and scope of the invention.

We claim:
1. A 1-aralkyl-3,3-disubstituted-2-vinylene-3H-indole corresponding to the formula:

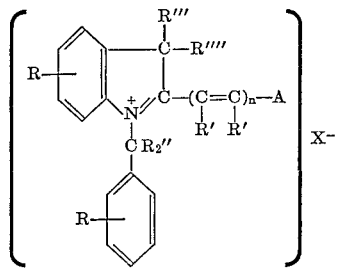

wherein:

R is selected from the group consisting of hydrogen, lower alkyl, lower alkoxy, cycloalkyl of 5 or 6 carbon atoms, nitro, halogen, cyano, aryl and aralkyl groups, said aryl groups being a member selected from the group consisting of phenyl, naphthyl and biphenyl;

R' is selected from the group consisting of hydrogen, lower alkyl, lower alkoxy and cyano groups;

n is a whole number from 1–5;

R'' is selected from the group consisting of hydrogen and lower alkyl;

R''' and R'''' are selected from the group consisting of lower alkyl, cycloalkyl of 5 or 6 carbon atoms, lower alkoxy, halogen, cyano, aryl and aralkyl groups, said aryl groups being a member selected from the group consisting of phenyl, naphthyl and biphenyl;

A is an indolyl group corresponding to the formula

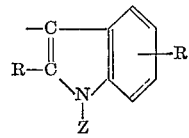

wherein

Z is a member selected from the group consisting of hydrogen, lower alkyl, and lower alkoxyalkyl, and R represents a substituent as defined above, and X is an anion.

2. The 1-aralkyl-3,3-disubstituted-2-vinylene-3H-indole as defined in claim 1 wherein the nitrogen of said indolyl group is substituted by a lower alkyl group.

3. The 1-aralkyl-3,3-disubstituted-2-vinylene-3H-indole as defined in claim 1 wherein said 1-aralkyl substituent is benzyl.

4. The 1-aralkyl-3,3-disubstituted-2-vinylene-3H-indole as defined in claim 1 wherein said 1-aralkyl substituent is chlorobenzyl.

5. The 1-aralkyl-3,3-disubstituted-2-vinylene-3H-indole as defined in claim 1 where R, R' and R'' are each hydrogen; R''' and R'''' are each lower alkyl; and n is 1 or 2.

6. The 1-aralkyl-3,3-disubstituted-2-vinylene-3H-indole as defined in claim 1 where R, R and R'' are each hydrogen; R''' and R'''' are each methyl; and n is 1.

7. The 1-aralkyl-3,3-disubstituted-2-vinylene-3H-indole as defined in claim 6 wherein the nitrogen of said indolyl group is substituted by a methyl group.

8. 2-[(1-methyl-2-phenylindol-3-yl)-vinylene]-1-benzyl-3,3-dimethyl-3H-indolium dihydrogen phosphate.

9. 2-[(1-methyl-2-phenylindol-3-yl)-vinylene]-1-benzyl-3,3-dimethyl-3H-indolium hydrogen sulfate.

10. 2-[(1-methyl-2-phenylindol-3-yl)-vinylene]-1-benzyl-3,3-dimethyl-3H-indolium chloride.

11. The 1-aralkyl-3,3-disubstituted-2-vinylene-3H-indole as defined in claim 7 wherein the nitrogen of said indolyl group is substituted by a lower alkyl group.

References Cited

UNITED STATES PATENTS 3,113,825  12/1963  Streck _____ 260—240 XR

FOREIGN PATENTS 622,008  6/1961  Canada.
596,243  4/1960  Canada.
673,529  11/1963  Canada.

JOHN D. RANDOLPH, Primary Examiner

U.S. Cl. X.R.

8—55, 7, 54; 260—326.11, 326.16, 326.5

UNITED STATES PATENT OFFICE
CERTIFICATE OF CORRECTION

Patent No. 3,514,453　　　　　　　Dated May 26, 1970

Inventor(s) Sydney M. Spatz and Audley L. Cain

It is certified that error appears in the above-identified patent and that said Letters Patent are hereby corrected as shown below:

Column 2, line 67, --a-- to be inserted between "thus" and "series".

Column 3, line 8, last word of line "ary-" should be --aryl--.

Column 3, line 12, "diflerent" should be --different--.

Column 3, line 17, "3-3-" should be --3,3- --.

Column 3, line 45, should be space between "to" and "the".

Column 4, line 3, "phenyl" should be --propyl--.

Column 4, line 7, "1,3,5-7-", should be --1,3,5,7- --.

Column 4, line 9, "-yl)vinylene", should be -- -yl)-vinylene--.

Column 4, line 9, "benzyl,", should be --benzyl- --.

Column 4, line 11, "3--yl)", should be --3-yl)--.

Column 4, line 31, between "with" and "2-alkylene" insert --a--.

Column 6, line 30, "sublimination" should be --sublimation--.

Claim 5, column 8, line 24, "where" should be --wherein--.

Claim 6, column 8, line 28, "where" should be --wherein--.

Claim 6, column 8, line 28, second "R" should be --R'--.

Signed and sealed this 1st day of June 1971.

(SEAL)
Attest:

EDWARD M. FLETCHER, JR.
Attesting Officer

WILLIAM E. SCHUYLER, JR.
Commissioner of Patents